US005884935A

United States Patent [19]

Tholkes

[11] Patent Number: 5,884,935

[45] Date of Patent: Mar. 23, 1999

[54] MODULAR STANDING SUPPORT

[76] Inventor: Alan L. Tholkes, 262 W. First St., Morton, Minn. 56270

[21] Appl. No.: 871,361

[22] Filed: Jun. 9, 1997

[51] Int. Cl.$^{6}$ ........................................................ B62B 9/10

[52] U.S. Cl. .................. 280/657; 280/650; 297/DIG. 10

[58] Field of Search ................................ 280/250.1, 657, 280/650; 297/DIG. 10

[56] References Cited

U.S. PATENT DOCUMENTS

| | | | |
|---|---|---|---|
| 4,555,121 | 11/1985 | Lockard et al. | 280/30 |
| 4,802,542 | 2/1989 | Houston et al. | 180/65.5 |
| 4,809,804 | 3/1989 | Houston et al. | 180/65.5 |
| 5,054,852 | 10/1991 | Tholkes | 297/172 |
| 5,108,202 | 4/1992 | Smith | 297/330 |
| 5,484,151 | 1/1996 | Tholkes | 280/250.1 |
| 5,489,258 | 2/1996 | Wohnsen et al. | 602/5 |
| 5,718,442 | 2/1998 | Alexander et al. | 280/250.1 |
| 5,803,545 | 9/1998 | Guguin | 297/316 |

*Primary Examiner*—J. J. Swann
*Assistant Examiner*—Michael Cuff
*Attorney, Agent, or Firm*—D. L. Tschida

[57] ABSTRACT

A reconfigurable support assembly accessible to a wheel chair bound user for supporting and elevating the user between seated and erect postures. A base frame is configurable to be stationary with foot pads or mobile with roller casters or wheels. Molded foot restraints mount to a base frame or an elevated cross tower to support the feet at selected orientations. A telescoping forward support framework accepts a variety of adjustable accessories, including cushioned knee or leg support assemblies, a chest or upper body support, a table top, arm troughs and manual, hand driven drive assemblies. Adjustable seat and seat back assemblies optionally support pivoting armrests, hip and lateral trunk supports, an extendible back support frame, shoulder retainers, and a head rest. The position of a seat cushion and inclination of the seat back are separately adjustable. In alternative seat assemblies, manual, cable released, gas filled cylinders cooperate with a cantilevered linkage coupled between the seat and base frame to pivot a seat linkage. In another seat assembly, a manually controlled hydraulic lift extends and retracts a seat linkage.

20 Claims, 8 Drawing Sheets

MODULAR STANDING SUPPORT

BACKGROUND OF THE INVENTION

The present invention relates to rehabilitation devices for the handicapped, and in particular, to a number of stationary and mobile standing supports designed for all ages.

Bedridden individuals or wheel chair bound users, notably paraplegics and other individuals with limited lower trunk or leg control functions, typically experience a progressive atrophying of the leg and calf muscles. Without ongoing physical therapy (e.g. massage) or engaging in activities that enhance blood circulation to the limbs, (e.g. standing), muscle tone deteriorates.

One solution to the dilemma is to mechanically support such individuals in an upright posture. Posturing the legs and trunk of the individual in an erect condition, allows the legs to completely or partially support the individual's body weight. Such activity, in turn, periodically exercises the leg muscles with consequent increased blood flow to the exercised limbs.

Various standing aids are available which provide a sling that acts as a seat and hip support. The lack of a rigid back support however requires the user to have a reasonable degree of upper body function and control. Without the benefit of attending personnel, many of such stands are difficult to access by wheel chair bound users. A pair of prone, wheel chair standers of this type are shown at U.S. Pat. Nos. 4,744,578 and 5,340,139, and which devices also exemplify the user dexterity that is required, but which many potential users do not enjoy.

Mobile, standing supports are also commercially available which include manual chain drive linkages that cooperate with one or more drive wheels. Such supports do not typically include active lift mechanisms. Instead, the user must lift himself or herself into an erect posture with the aid of provided gripping supports. Once erect, the user must also be capable of strapping available restraints into position to maintain the user in an erect posture.

U.S. Pat. No. 5,265,689 discloses a battery powered, mobile stander having a powered lift assembly. That is, a motorized drive linkage controls available drive wheels. A separately powered lift assembly includes support arms that extend from a telescoping column and mount beneath the user's arm pits to support and elevate the user between seated and standing postures.

Another standing support assembly which supports a user between seated and standing postures is disclosed at U.S. Pat. No. 5,054,852 and is sold under the brand name EASYSTAND by Altimate Medical, Inc. of Redwood Falls, Minn. An improved version of this assembly is also disclosed at U.S. Pat. No. 5,484,151. The foregoing assemblies provide hydraulically controlled, pivoting support linkages to a seat, which seat appropriately rotates to continuously support the buttocks and back of a user between a seated and fully erect posture.

The present invention provides a number of other improved standing supports or aids, which are modularly constructed. The aids are constructed about, pivoting seat and seat back frameworks that can be arrayed with multiple accessories to serve the particular needs of each user. The assemblies particularly provide seat assemblies with seat and back supports which can be adjusted and a pivoting linkage to support the user from wheel chair transfer through the entire seating to lifting process and to comfortably restrain the user, once erect. The linkages include pneumatic and hydraulic assist assemblies. Limited dexterity and muscle control is required beyond that necessary for the user to transfer himself or herself to the standing support.

SUMMARY OF THE INVENTION

It is a primary object of the present invention to provide a modular standing support assembly which is easily accessed by the handicapped, particularly wheel chair bound users, which facilitates chair to support transfer and which provides a tailored continuous support to the user between seated and erect postures.

It is a further object of the invention to provide a modular standing support having appurtenant supports which pivot to accommodate user transfer from a wheel chair to a seat assembly at the standing support.

It is a further object of the invention to provide a modular standing support which includes a seat assembly having a pneumatic assisted or hydraulically actuated support linkage to raise and lower the seat and user between seated and fully erect postures.

It is a further object of the invention to provide a modular standing support that accommodates school age children, serves as a desk in a lowered condition and provides a work table when standing, and can be adjusted with the child's growth.

It is a further object of the invention to provide a seat assembly having a tilt adjusted back support, which selectively accepts a head rest, extension frames, lateral trunk supports, shoulder retainers and hip guides that cooperate with the seat frame.

It is a further object of the invention to provide a modular standing support having a seat assembly wherein the seat adjusts longitudinally relative to the seat back and wherein the tilt angle of seat back adjusts relative to the seat.

It is a further object of the invention to provide a modular standing support which can be stationary or manually maneuvered.

It is a further object of the invention to provide a modular standing support which includes a hand driven, user controlled drive system.

It is a further object of the invention to provide a hand driven drive system to each of a pair of drive wheels wherein a hand wheel and tension adjusted drive belt depends from an upright support column to each drive wheel.

It is a further object of the invention to provide a drive system including wheel locks.

It is a further object of the invention to provide a modular standing support having a table and arm troughs which are height and depth adjustable.

It is a further object of the invention to provide a modular standing support having foot supports that independently adjust to support each foot at a preferred orientation.

Various of the foregoing objects, advantages and distinctions of the invention are particularly obtained in alternative standing supports which are described in detail with respect to the appended drawings. Similar parts and assemblies at each support are denoted with similar alphanumeric reference characters.

In one basic stationary standing support, a central "J" shaped frame member supports a pivoting seat assembly at one end and a telescoping chest support and hand grips at another end. Telescoping arm rests project from support arms at a base frame. A manually controlled, pneumatic piston assists rotation of a cushioned seat and a pair of lateral trunk supports.

In alternative mobile standing supports constructed for adults and children, a base frame accepts roller castors or hand controlled drive assemblies. An upright, cross tower at the base supports a pair of molded foot restraints which can be independently tilted and vertically and/or laterally adjusted.

The foot support tower also supports a forward pivot coupler and alternative pneumatic or hydraulic assisted seat frames. A hand controlled cable and latch vary the extension of a piston from a pneumatic or gas charged cylinder. The piston pivotally biases the seat to an erect condition and resists motion of the seat to a seated condition. Alternately, a hand pumped, hydraulic cylinder directs a piston to pivot a seat and direct the seat between horizontal and vertical alignments with a consequent raising and lowering of the occupant between seated and standing postures.

Telescoping members at the seat frame and between a seat back frame and forward pivot coupler control the longitudinal extension of the seat cushion and the tilt angle of a back support frame. A variety of cushioned accessory supports mount to the seat assembly, including a high back seat frame and back cushions; a number of cushioned arm rests; hip and lateral trunk supports; shoulder retainers; and a head or neck support. The supports variously adjust in multiple planes to fit the occupant.

A telescoping, upright primary support framework extends from the base frame. A tabletop and/or arm troughs mount to an upper end of the framework and a chest support telescopes from the tabletop support frame. Hand screw operated clamps control the extension of the telescoping members. A cushioned knee support having separately adjusted pads or a pair of vertical channels support an occupant's knees and legs. The extension of the knee support from the primary support framework is also adjustable.

The hand driven drive assembly includes a pair of drive belts that extend between pulleys at left and right hand wheels and drive wheels which are secured to the left and right sides of the primary support framework and base frame. Separate belt tensioners and wheel locks cooperate with each belt and drive wheel.

Still other objects, advantages and distinctions of the invention are disclosed in the following description with respect to the appended drawings. Various considered modifications and improvements are described as appropriate. The description should not be strictly construed in limitation of the invention, which rather should be interpreted within the scope of the appended claims.

DESCRIPTION OF THE PREFERRED EMBODIMENTS

Figure 1:
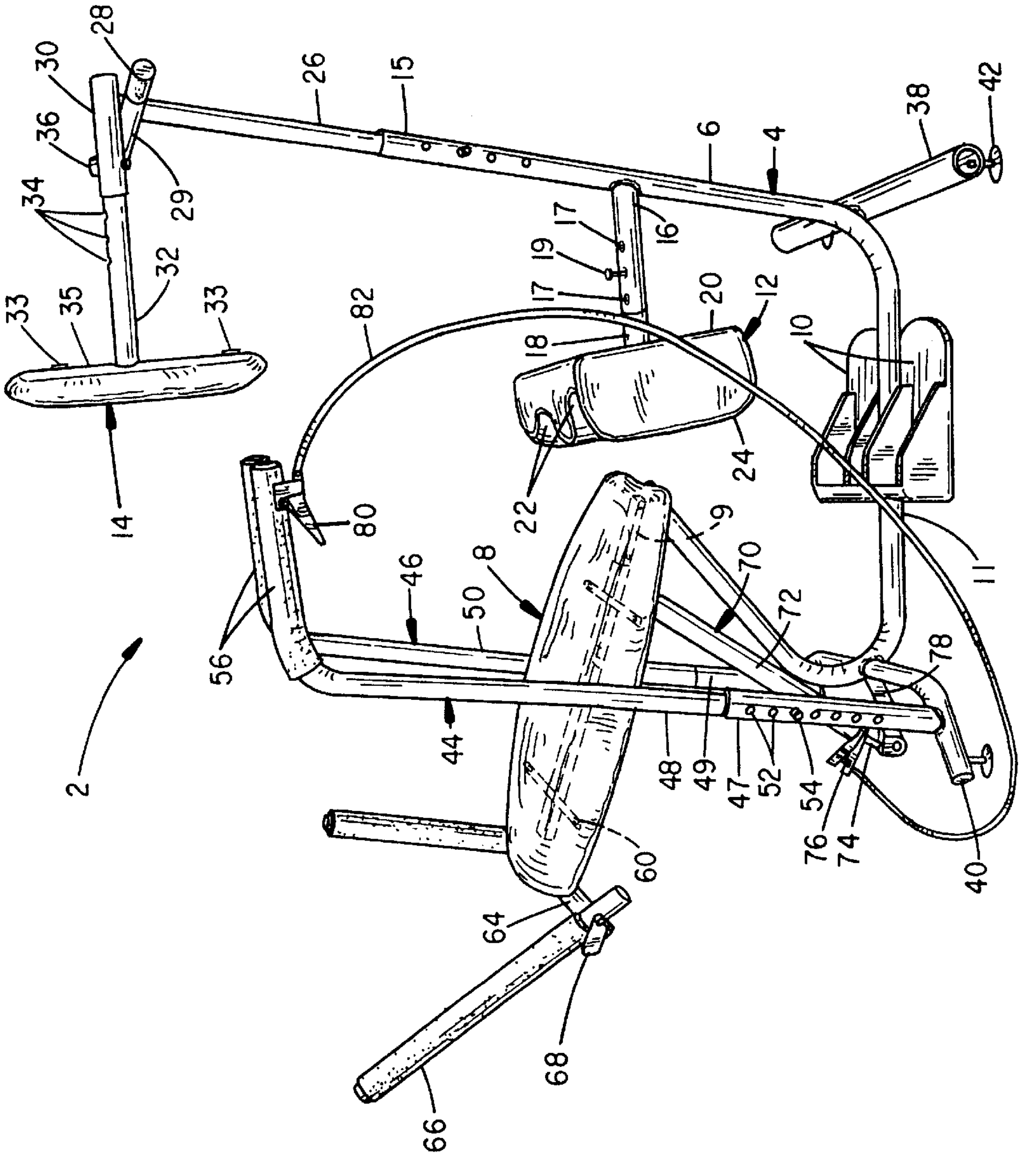
FIG. 1 is a perspective drawing showing a stationary standing support in a seated condition.
Figure 2:
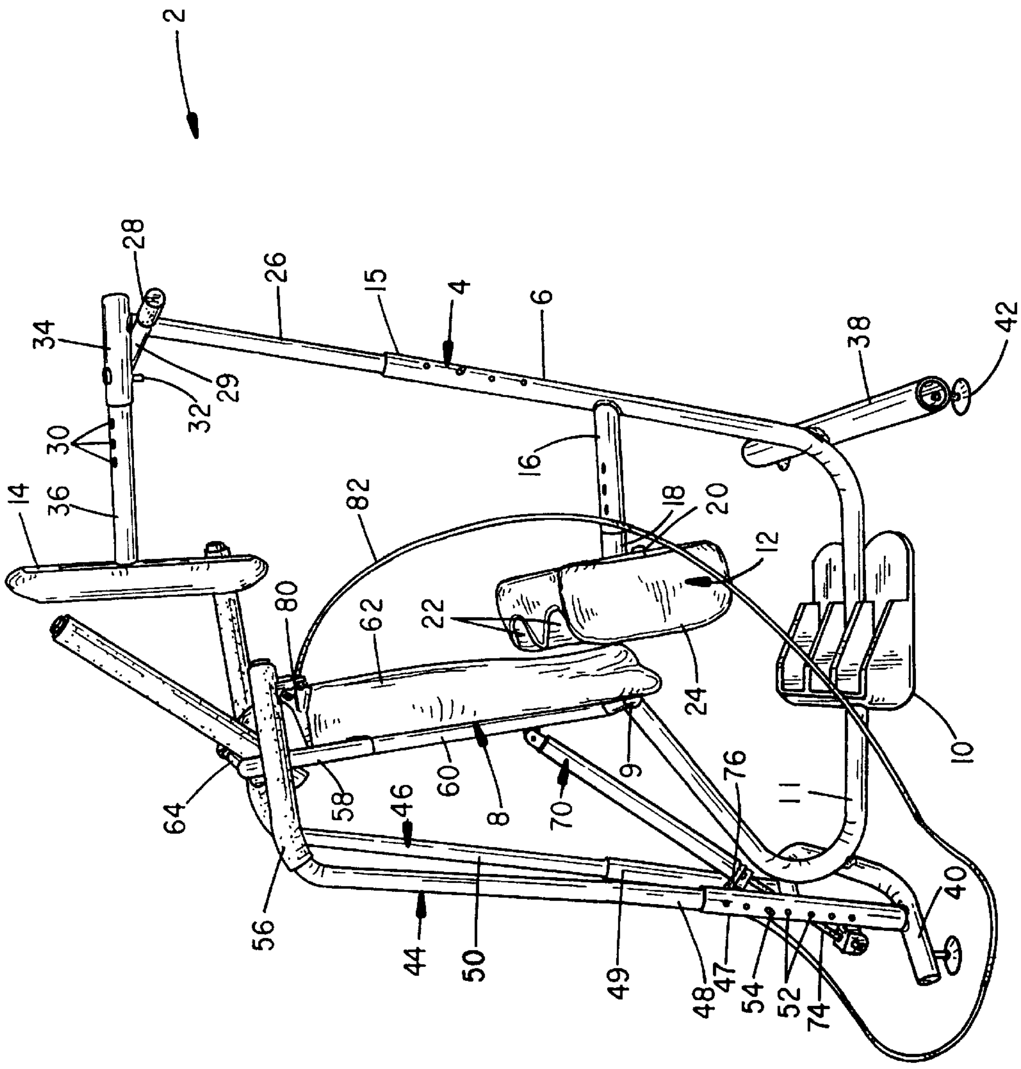
FIG. 2 is a perspective drawing showing the standing support of FIG. 1 in an erect condition.

Referring to FIGS. 1 and 2, perspective drawings are shown to a stationary standing aid 2 in respective seated and erect conditions. The aid 2 is constructed of a base framework 4 which includes a "J" shaped primary frame member 6 that supports a seat assembly 8 at one end and a chest support 14 an opposite end. The seat assembly 8 is mounted to pivot at a coupler 9 between a horizontal, seated and a vertica, erect conditions.

A pair of foot restraints 10 are mounted along a horizontal section 11 of the frame member 6. A cushioned knee or leg support 12 and the cushioned chest support 14 mount to a vertical section 15 of the member 6. A pair of members 16 and 18 extend horizontally from the section 15 and support a back plate 20 of the leg support 12. Upon telescoping the member 18 from the member 16 and aligning holes 17 at the members 16 and 18 and securing a lynch pin 19 through the aligned holes 17, the extension of the leg support 12 is adjusted.

A pair of vertical channels 22 are formed into a cushioned front surface 24 of the leg support 12. The height of the leg support 24 can be vertically adjusted at the back plate 20 by varying the relative position of the back plate 20 to the leg support 12 at a number of fasteners secured through available mounting slots in the back plate 20 and to the leg support 12.

An extension column 26 telescopes from the vertical section 15. A pair of hand grips 28 radiate laterally from a cross member 29 fitted to an upper end of the column 26. A pair of tubular frame members 30 and 32 support the chest support 14. The member 32 telescopes from the member 30 to control the extension of the chest support 14. Alignable holes 34 and a pin fastener 36 fix the extension of the chest support 14 from the upright members 15 and 26. Screw fasteners 33 fitted through apertures and/or slots in a backing plate 35 at the end of the member 32 and chest support 14 determine the elevation of the chest support 14.

Radiating from the fore and aft ends of the frame member 6 are lateral floor support arms 38 and 40 and from which height adjustable, non-marring pads 42 depend. A pair of telescoping arm rest support assemblies 44 and 46 project from the floor support arm 40. The arm rest support 44 and 46 are constructed of pairs of telescoping columns 47, 48 and 49, 50. Alignable holes 52 at the mating columns 47, 48 and 49, 50 receive a lynch pin fastener 54 to establish the appropriate extension. Cushions 56 are secured to bent ends 58 of the columns 48 and 50 to provide arm rests and lateral trunk support to the seated and erect user.

Turning attention to the seat assembly 8, a frame 60 supports a seat cushion 62. A forward end of the frame 60 is mounted to the pivot coupler 9 and the member 6. A cross arm 64 laterally extends from the aft end of the frame 60. A pair of tubular members 66 having cushioned covers pivot relative to the seat frame 60 at couplers 68 which are fitted to the cross arm 64. The members 66 rotate with the seat frame 60 and cushion 62 and provide hip and trunk support to the user in both the seated and erect postures.

Fitted to pivot with the seat frame 60 is a pneumatic assist assembly 70. The pneumatic assist 70 includes a cylinder 72 which pivots at the frame 60 and a piston 74 that pivots at a yoke member 78 that projects from the support arm 40. A latch 76 is fitted at the juncture between the cylinder 72 and piston 74 to alternately grip and release the piston 74. A handle 80 and cable 82 control the latch 76 such that upon releasing the latch 76, the piston 74 can extend or retract in response to a contained gas charge at the cylinder 70 or an offsetting weight of the user. Upon releasing the latch 76, the seat frame 60 and seat cushion 62 are normally biased by the pneumatic assist 70 to rotate and rise to follow the user, who simultaneously pulls on the hand grips 28.

Alternatively and from an erect posture, the release of the latch 76 and the weight of the user causes the seat 62 to fall under the bias of the gas charge to slowly lower the user. The rate of fall can be varied by the user offsetting a portion of his or her weight by gripping the hand grips 28. Upon releasing the handle 80 at any time during the extension or retraction of the piston 74, the latch 76 re-engages the piston 74 to lock and maintain the extension. A similar pneumatic assist assembly 70 is provided at the standing support 90 shown at FIGS. 3 and 4.

Figure 3:
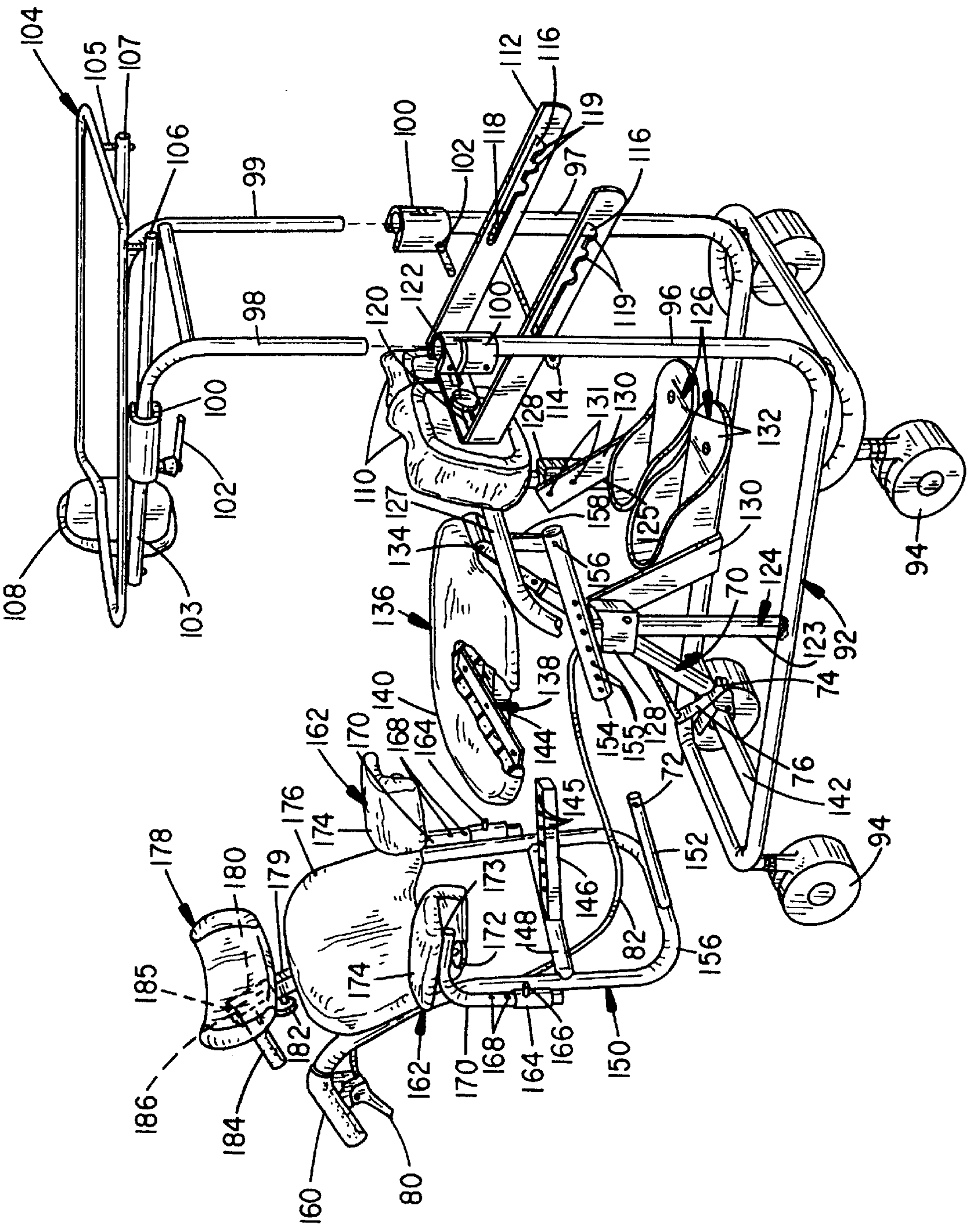
FIG. 3 is a perspective drawing of a manual standing support constructed for children and shown in a seated condition.
Figure 4:
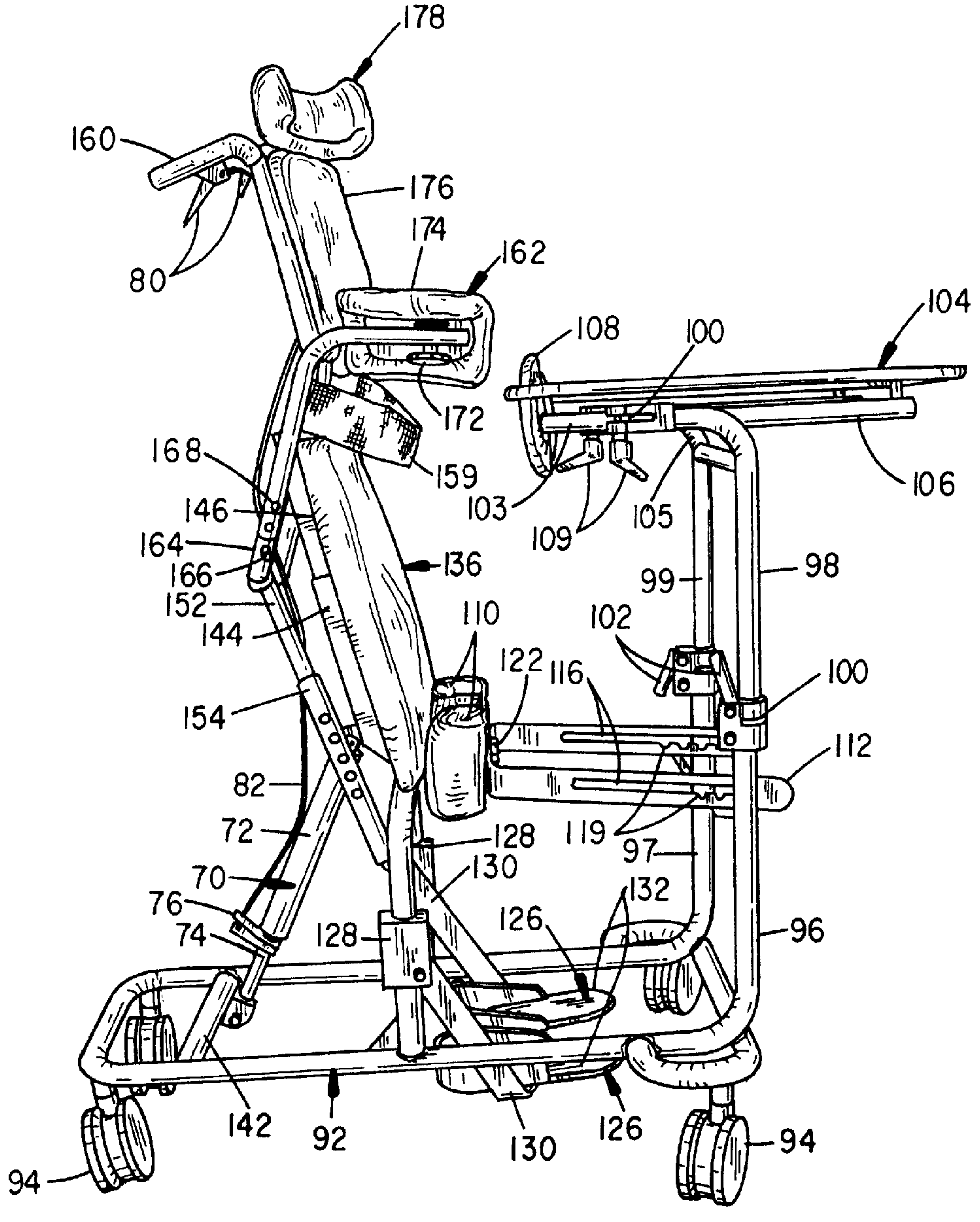
FIG. 4 is a perspective drawing of the standing support of FIG. 3 shown in an erect condition.

Turning attention to FIGS. 3 and 4, views are shown to a more elaborate modular, standing support 90. The support 90 is particularly constructed for use by school age children. The standing support 90 provides a tubular base frame 92 which is supported by a number of furniture casters 94. A pair of upright vertical columns 96 and 97 extend from the base frame 92 and receive a pair of telescoping columns 98 and 99. The relative extension of the columns 96, 98 and 97, 99 from one another is determined by split, compression clamps 100. Hand screws or lever arms 102 at the clamps 100 control the pressure applied by the clamps 100 and maintain the relative extension of the mating columns 96, 98 and 97, 99.

A table top 104 mounts to bent horizontal extensions 103, 105 of the members 98, 99. Vertically offset rails 106 and 107 are fitted to the bottom of the table top 104 and are secured to the extensions 103 and 105 with separate clamps 100. Upon fixing a desired position of the table top 104 and extension of the chest support cushion 108, which is secured to the front edge of the table top 104, the clamps 100 are locked. The chest cushion 108 might be separately mounted to a telescoping extension assembly fitted to the table top 104.

A pair of separately adjusted, cushioned leg supports 110 are fitted to the vertical columns 96 and 97. The supports 110 mount to a "U" shaped frame 112 that rests on a cross member 114. Slots 116 ride along pins 118 that project from the columns 96, 97 and upon rotating selected recesses or notches 119 to engage the pins 118, the horizontal extension of each support 110 is determined. Slots 120 formed in the frame 112 and hand screws 122 that mate to threaded fittings in the back of the supports 110 control the lateral position and separation between the supports 110.

An inverted "U" shaped cross tower 124 vertically projects from the base frame 92 and supports a pair of foot supports 126 at right and left uprights 123, 125. Each foot support 126 provides a clamp block 128 which is secured to one of the uprights 123 and 125 and by which the height of each foot support 126 can be adjusted. An arm 130 depends from each block 128 and contains a molded plastic foot pad 132. The lateral and longitudinal position of each foot pad 132 is adjusted along a horizontal portion of each arm 130 is that extends beneath each pad and is fixed upon securing an overlapping clamp plate 129, reference FIG. 6*c*. The angle of each foot pad 132 can be separately adjusted by varying the position of fasteners 131 at the clamp block 128 relative to slots or apertures in the arms 130.

Supported at the center of a horizontal cross member 127 of the tower 124 is a seat assembly 136. The seat 136 pivots between horizontal and vertical positions at a pivot collar 134 secured to the cross member 127, under the control of a gas or pneumatic assist assembly 70. One end of the cylinder 72 pivots at the pivot collar 134 and a mating collar piece that depends from a telescoping seat frame 138 secured to the bottom of a cushioned seat 140. The exposed end of the piston 74 is secured to a latch 76 at a cross member 142 of the base frame 92. A handle 80 and cable 82 control the latch 76 and the relative extension of the piston 74 from the cylinder 72.

The seat frame 138 includes a pair of telescoping members 144 and 146. The relative extension of the members 144 and 146 is determined by a pin fastener 145 at aligned holes 147. The member 146 extends from a cross member 148 at a seat back frame 150. A second set of telescoping members 152 and 154 separately mount between a cross member 156 at the seat back frame 150 and a hanger 158 that depends from the pivot collar 134 adjacent the forward end of the member 144. The members 152, 154 establish a tilt angle at the seat back frame 150, upon aligning and pinning selected ones of the holes 155. The member 154 separately pivots at a pivot pin 156 at the hanger 158 as the seat frame 136 rises and falls between the seated and erect conditions. A seat belt 159 can be secured to the back back frame 150 and to the user to stabilize the user during posture changes.

Hand grips 160 are provided at the upper end of the seat back frame 150. Arm rests 162 are mounted to the seat back frame 150 and can be independently adjusted vertically and horizontally or rotated at a collar 164 and lynch pin 166 which mates to a selected hole 168 in a riser arm 170. A hand screw 172 is fitted to each arm 170 and mates with a clamping carriage 173 fitted to the bottom of an arm cushion 174 to permit lateral and/or fore and aft longitudinal adjustment of the arm cushions 174. In normal use, the arm rests 162 can be adjusted vertically, laterally or longitudinally, or be removed or rotated to facilitate user access to the seat 136.

Supported to a back support cushion 176 is a head rest assembly 178. The head rest 178 is mounted to a pair of telescoping members 179 and 180 that extend from the seat back frame 138. The extension of the member 180 is determined with a hand screw 182. Extending from a backing plate of the head rest 178 is a member 184 that mates with a yoke collar 185 at the end of the vertical member 180, which contains a separate hand screw 186. The extension of the member 184 is fixed by the hand screw 186. The head rest 178 can thus be independently adjusted vertically and longitudinally upon setting the extension of the members 180, 184.

The multiplicity of adjustments at the standing support 90 accommodates classroom use by school age children and normal growth over many years. The support 90 serves as a desk and a stander and in addition to providing physical benefits has been found to enhance the emotional and social well-being of most school age users.

Turning attention to FIGS. 5 through 8, views are shown to yet another modular standing aid 200, which is principally constructed for adults. The aid 200 is constructed to include many of the assemblies of the standing support 90. For example, the standing support 200 includes a comparable base frame 201, seat frame 138 and seat back frame 150. The base frame 201 can be supported from casters 94 or, like the base frame 92, can be adapted to a manual, hand drive assembly 202 shown at FIG. 8.

The standing support 200 may also be fitted with a number of accessory supports to accommodate the adult user. For example, the seat assembly 136 can be fitted with a pair of hip guides 206. The back support frame 150 can be separately outfitted with a head rest 178, a pair of pivoting arm rests 210, lateral trunk supports 212, a high back support assembly 214 and shoulder retainers 216. The head rest 178 can be mounted to either the back cushion 176 or to the high back support assembly 214, as depicted. Arm troughs 218 can also be mounted to the front, upright support framework 230. The drive assemblies 202 and many of the foregoing supports 212, 214, 216 and 218 can also be adapted to the standing support 90. The construction of these various supports is discussed below.

In lieu of a pneumatic spring 70 to bias the seat assembly 136, the standing support 200 provides a manually pumped, hydraulic jack or lift assembly 232. An electrically actuated, ball-screw and worm gear type of lift assembly may be substitutedin certain circumstances, if desired. The lift 232 is provided with a distinguishable support linkage over that disclosed at U.S. Pat. No. 5,484,151, although generally operates in a comparable fashion to control the raising and lowering of the seat 136. However, it is believed the linkage of the present lift assembly 232 offers greater adjustment with a smoother operation.

Figures 6, 6A, 6B, 6C:
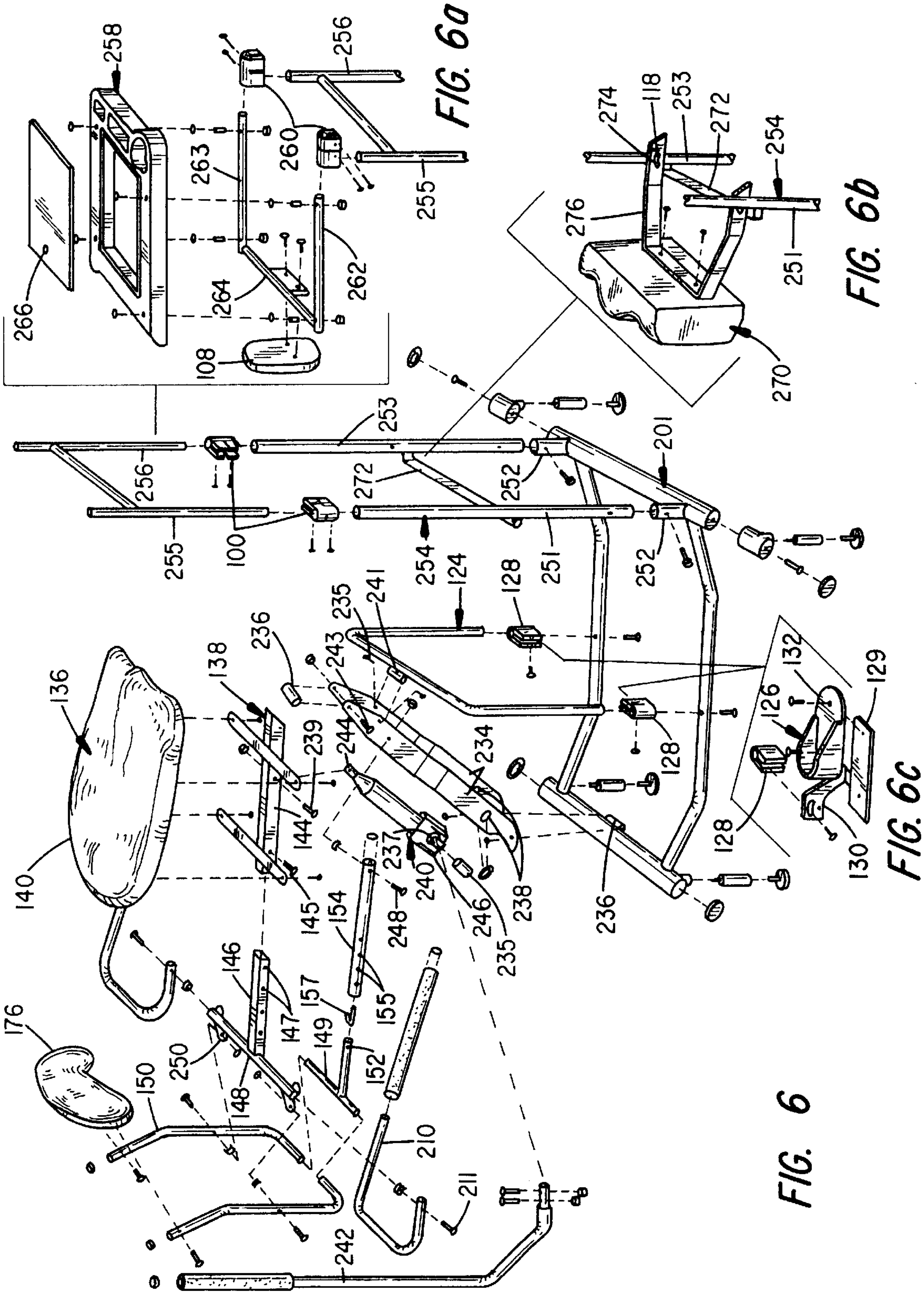
FIG. 6 is a perspective drawing shown in exploded assembly of the seat support linkage, foot support tower and front support column of the standing aid of FIG. 5.
FIG. 6*a* is a breakaway section drawing of the mounting of a table support to the standing aid of FIG. 6.
FIG. 6*b* is a breakaway section drawing of the mounting of a knee and leg support to the standing aid of FIG. 6.
FIG. 6*c* is a breakaway section drawing of the mounting of a foot support to the standing aid of FIG. 6.

With attention to FIG. 6, the lift assembly 232 includes a hydraulic jack 240 which has a pump arm or handle 242, piston 244 and cylinder 246. The piston 244 is secured to pivot relative to the seat frame 138 at a pivot pin 239 which is mounted to the seat frame member 144. The cylinder 246 is separately secured to pivot between a pair of linkage arms 234, that extend from a pivot coupler 236 at the base frame 201.

Stub axles 237, which control the extension and retraction of the piston 244, extend from the right and left sides of the cylinder 246 and mount through bushings 235 at apertures 238 in the linkage arms 234. The pump handle 242 can be mounted to either of the stub axles 237 to accommodate right or left hand users. The ends of the jack 240 are therefore able to pivot at the stub axles 237 and the pivot pin 239.

The upper end of the linkage arms 234 are secured with a pivot pin 243 to a bushing 236 mounted to the forward end of the seat frame member 144. The arms 234 are separately secured with a pivot pin 235 to a pivot coupler 241 at the upright cross tower 124. With the operation of the pump handle 242, the piston 244 extends and retracts from the cylinder 246 to appropriately pivot the intervening linkage members to actively raise and lower the seat 136 in lieu of merely providing a resilient bias, as with the pneumatic assist assembly 70.

The position of the seat cushion 140 relative to the seat back frame 150 is established upon fixing the extension of the telescoping seat frame members 144, 146 with a fastener 149 at aligned apertures 147. The inclination or tilt of the seat back frame 150 is separately established by setting a fastener 157 at aligned apertures 155 in the telescoping seat frame members 152 and 154. The forward end of the frame member 154 mounts to the linkage arms 234 at a pivot pin 248. The aft end of the frame member 152 is welded to a cross member 149 of the seat back frame 150. The separate depth and inclination adjustments of the seat cushion 140 in combination with the multiple pivot joints at the seat frame 138 and lift linkage 232 provide a smooth transition between the extremes of the seat rotation.

The arm rests 210 are secured to pivot at fasteners 211 which secure the arm rests 210 to the ends of a cross member 148 of the back support frame 150. The seat frame member 146 extends from the cross member 148 and the frame member 148 is separately secured to the back support frame 150 to pivot at depending pivot brackets 250. A seat belt 159 may also be mounted to the cross member 148.

Figure 5:
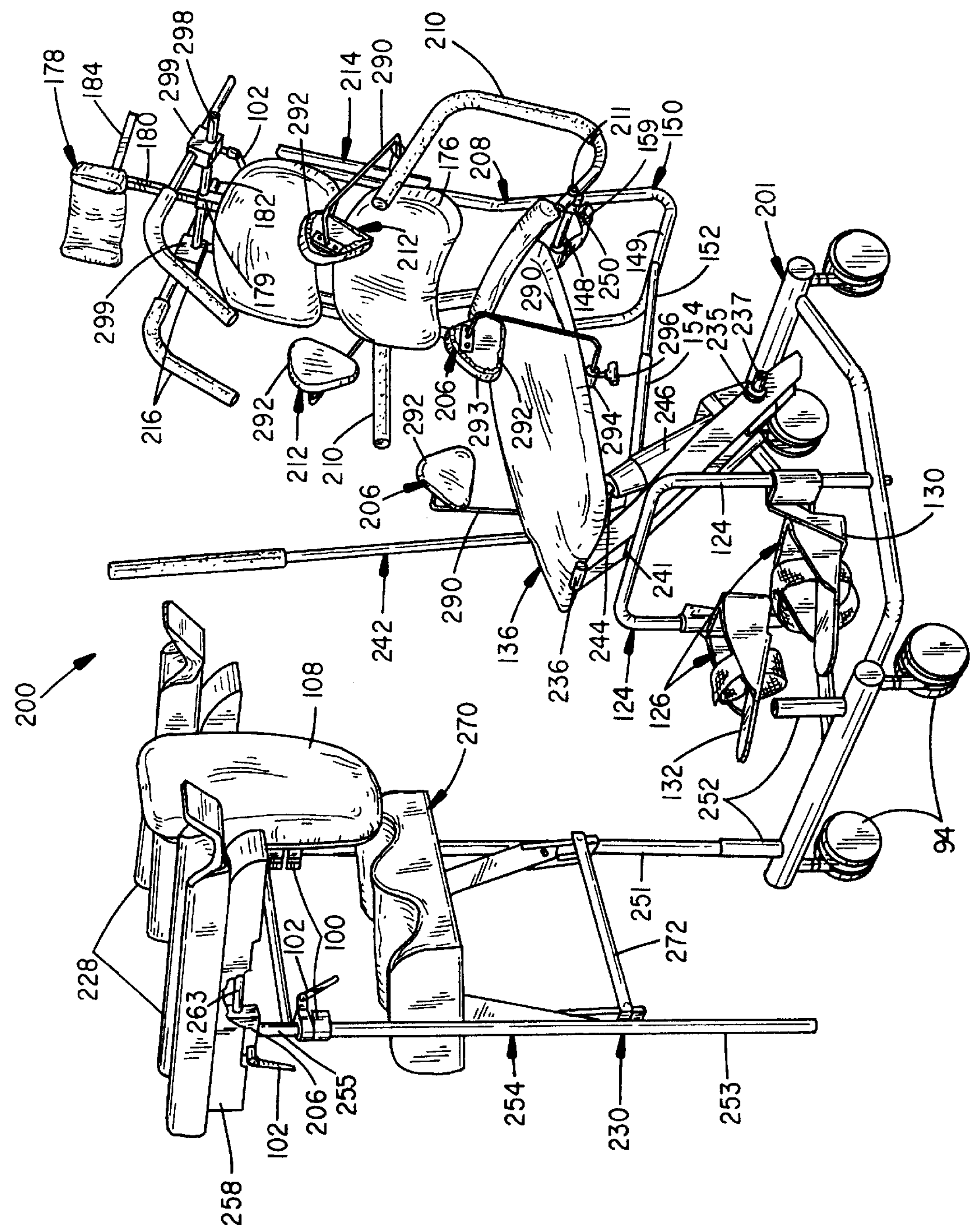
FIG. 5 is a perspective drawing showing a modular standing support having a hydraulic lift fitted to an adjustable seat and back support assembly and outfitted with supports for the feet, legs, hips, chest, arms, back, neck, head and shoulders, many of which supports are adjustable in one or more axes.

Fitted to tubular stub pieces 252 at the base frame 201 is the upright support framework 230. Tubular uprights 251 and 253 of an "H" shaped frame 254 mount to the stub pieces 252 and telescoping frame members 255, 256 extend from compression clamps 100 to control the height of a table 258 and the arm troughs 228. The arm troughs 228, if used and shown at FIG. 5, are normally secured to the top and sides of the table 258.

Details to the mounting of the table 258 are shown in the breakaway section drawing of FIG. 6*a*. The table 258 is secured to the uprights 255 and 256 with compression clamps 260. The longitudinal extension of the table 258 is adjusted by controlling the extension of rails 262 and 263, which are secured to the bottom of the table 258, along the clamps 260. A chest support 108 is separately secured to a cross rail 264 that extends between the rails 262 and 263 and the elevation of which can be adjusted by varying the mounting location of associated fasteners secured to a backing plate. A replaceable cover 266 is fitted to the table 258. It is to be appreciated the table 258 can be used alone or with the arm troughs 228.

A cushioned knee or leg support assembly 270, which is shown in breakaway section drawing of FIG. 6*b*, is separately supported to the upright support framework 254 at a cross member 272. The leg support assembly is retained at pins 118 that cooperate with shaped slots 274 in a "U" shaped bracket arm 276. The extension of the support 270 is particularly adjusted by interlocking selected recesses of the slots 274 with the pins 118.

Figure 7:
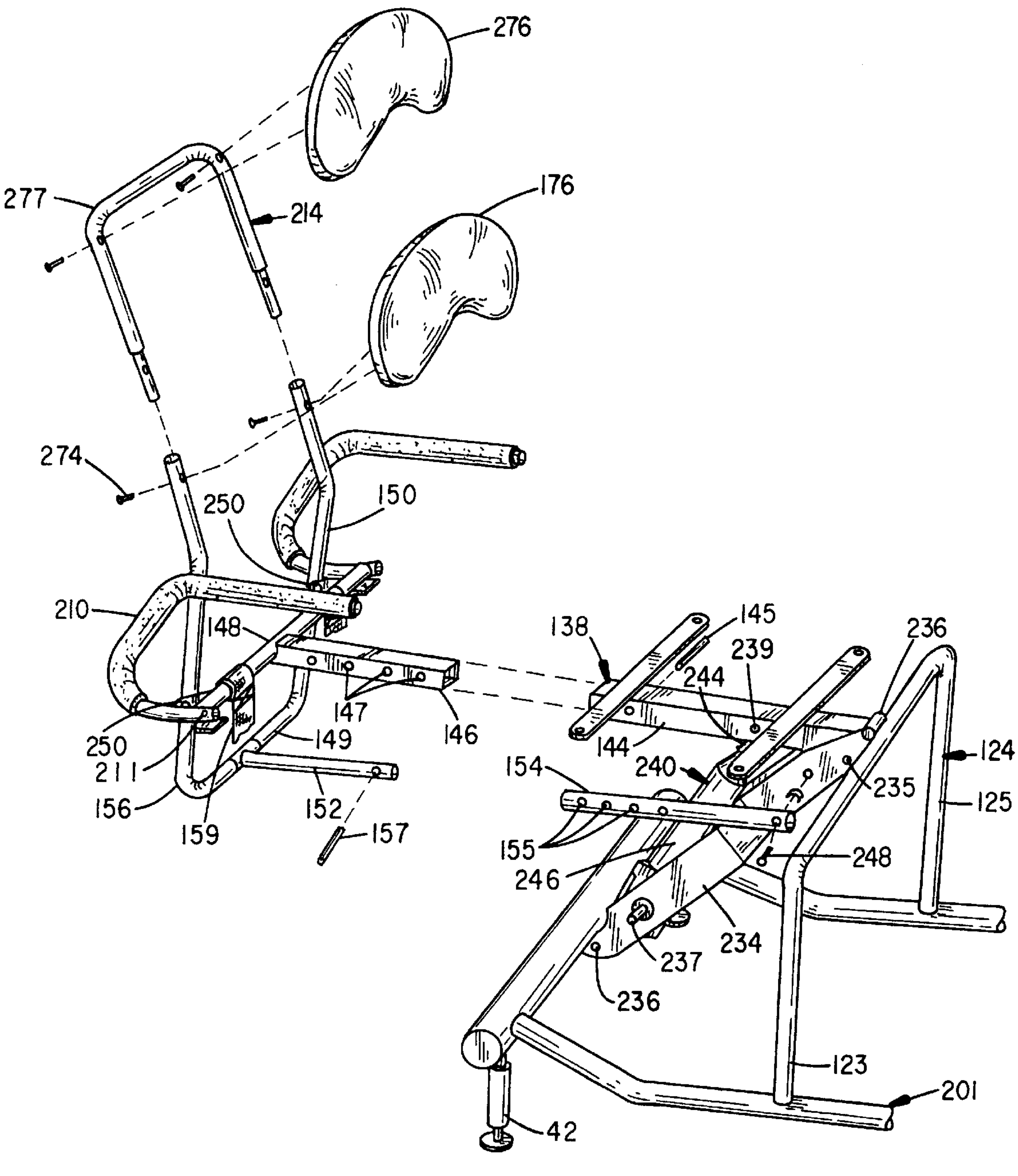
FIG. 7 is a perspective drawing shown in partial exploded assembly to the seat support linkage and a high back support frame assembly which is adaptable to the standing support of FIG. 5.

FIG. 7 depicts additional detail to the construction of the seat support frame 138. Different mounting positions of the seat cushion 140 relative to the back support frame 150 are accommodated upon selecting a preferred alignment of the holes 147 in the members 144, 146 and setting the fastener pin 145. The angle of the back support frame 150 is established upon mounting of a fastener pin 157 to appropriately aligned holes 155 in the members 152, 154.

Secured to the back support frame 150 is a high back extension assembly 214. Ends of a frame member 277 slide mount to the ends of the lower frame member 156 and are secured with fasteners 274. A separate back support cushion 276 is secured to the member 277 above the lower cushion 176 and supports the back in the region of the shoulder blades.

Figure 8:
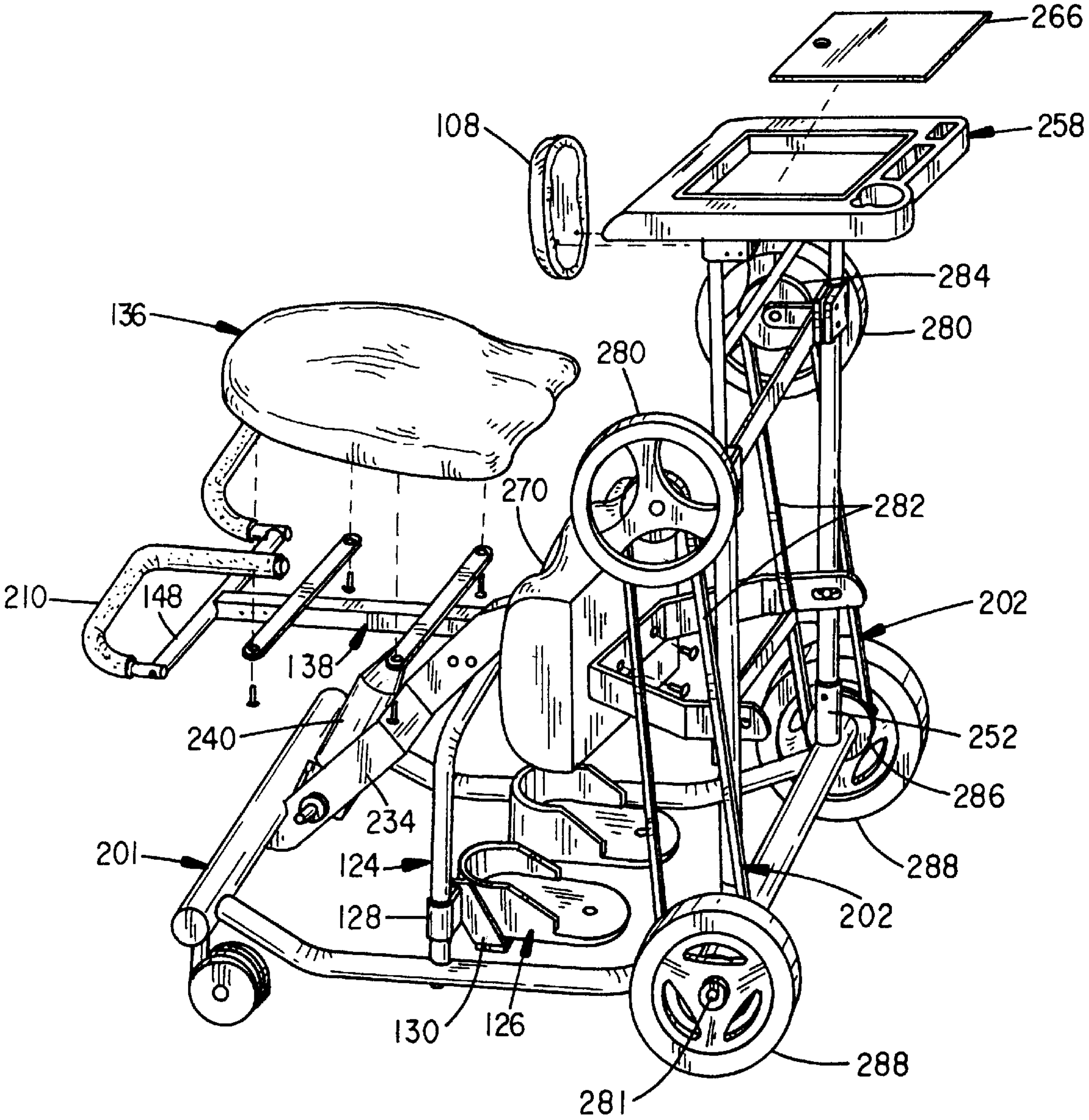
FIG. 8 is a perspective drawing shown in partial exploded assembly of the standing support of FIG. 5 outfitted with right and left hand driven drive assemblies.

FIG. 8 depicts a pair of manual, hand operated drive assemblies 202 that can be fitted to either the standing supports 90 or 200. The assemblies 202 each include a hand wheel 280 that is secured to one of the upright column members 96, 97 or 251, 253. A "V" belt 282 is trained about upper and lower pulleys 284, 286 which are respectively secured to each hand wheel 280 and a ground wheel 288 that is substituted for one of the stationary pads 42 or rolling casters 94. Each wheel 280 is secured to an axle 281 that is mounted to the base frames 92 or 201. User directed rotation of the hand wheels 280 induces rotation of the drive wheels 288 to propel the standing supports 90 or 200.

As also noted above and with attention re-directed to FIG. 5, numerous other accessory supports can be outfitted to either of the standing supports 92 or 200 in addition to the high back frame 214 and drive wheels 202; that is, hip guides 206, lateral trunk supports 212, and shoulder restraints 216. The hip guides 206 and trunk supports 212 each generally include an arm 290 that contains a cushioned pad 292 at one end and which is secured to a coupler 294 at an opposite end. The arm 290 is bent to assure the pad 292 contacts the user's hips, thighs or upper body upon appropriately fixing the extension of the arm 290 at its mating coupler 294. A hand screw 296 at the coupler 294 fixes a desired extension.

The shoulder restraints 216 are typically secured to a back frame that is outfitted with a head rest 178. The cushioned restraints 216 are typically secured to a cross arm 298 which contains a pair of clamps 299. The cross arm 298 is secured to the end of the frame member 179 and held in place with the hand screw 182, upon fixing the extension of the frame member 180. The longitudinal extension and lateral location of each restraint 216 is adjusted along the cross arm 298 with separate hand screws 102 at each clamp 299. Although a variety of accessory restraints and supports have been described, it is to be appreciated they may be used or not as appropriate for a particular user.

While the invention has been described with respect to a number of alternatively considered constructions, it is to be appreciated still other constructions and combinations of accessories may be suggested to those skilled in the art. The following appended claims should therefore be construed to include all of those equivalent embodiments within the spirit and scope thereof.

What is claimed:

1. Support apparatus for supporting and manipulating a user between sitting and standing positions comprising:

a) a framework including 1) a plurality of frame members coupled to one another to provide a base and a telescoping upright support frame secured to said base, 2) foot support means secured to said base for supporting the feet of a user; and 3) seat means including a seat for pivotally securing said seat to said base;

b) chest support means secured to said support frame for supporting the chest of the user;

c) leg restraint means secured to said support fame for restraining the legs of the user; and d) lift means mounted to said base for pivoting said seat and including a piston mounted and biased for reciprocating movement within a pre-charged cylinder, wherein a latch means is coupled alone the length of the piston and operative at release and latch positions to selectively and directly grip said piston and control the movement of said piston, such that in the release position said piston is free to extend and retract relative to the weight of the user on said seat and in the latch position said piston is prevented from moving, wherein movement of said piston rotates said seat between a transverse orientation to said support frame at a sitting position and a parallel, displaced orientation to said support frame at a standing position, and wherein at said standing position the seat supports the user in engagement with said chest support means and said leg restraint means.

2. Support apparatus as set forth in claim 1 wherein a handle and a cable control the operation of said latch means.

3. Support apparatus as set forth in claim 1 including an upright cross tower secured to said base, wherein said foot support means is secured to said cross tower, and wherein said foot support means includes foot support pads which are independently adjustable relative to said cross tower.

4. Support apparatus as set forth in claim 3 wherein said foot support means permits the independent adjustment of the inclination and displacement of each foot support pad relative to said support frame.

5. Support apparatus as set forth in claim 3 wherein said seat comprises a seat frame and a back frame, wherein said seat frame is mounted to a first pivot means at said cross tower, and including means for selectively fixing the displacement of a seat cushion secured to said seat frame and relative to said back frame, and further including means for selectively fixing the inclination of said back frame to said seat frame.

6. Support apparatus as set forth in claim 5 wherein said seat frame includes first telescoping means for varying the displacement of said seat cushion from said back frame, wherein a second telescoping means varies the inclination of said back frame relative to said seat frame, and wherein said second telescoping means is mounted to a second pivot means secured to said cross tower.

7. Support apparatus as set forth in claim 5 wherein said back frame includes first and second arm rests and means for varying the displacement of said first and second arm rests from said seat frame and from said back frame and for rotating said first and second arm rests relative to said back frame.

8. Support apparatus as set forth in claim 5 wherein said back frame includes a head rest and means for varying the displacement of said head rest along said back frame and the extension of said head rest from said back frame.

9. Support apparatus as set forth in claim 5 wherein said back frame includes means for securing an extension frame section having a second back support cushion to a lower frame section.

10. Support apparatus as set forth in claim 3 including adjustment means for varying the displacement of said chest support means relative to said support frame and a table mounted to said adjustment means.

11. Support apparatus as set forth in claim 3 including adjustment means for varying the displacement of said chest support means relative to said support frame and a pair of arm rests mounted to said adjustment means.

12. Support apparatus as set forth in claim 1 wherein said leg restraint means comprises first and second cushions secured to a bracket, wherein said first and second cushions are independently and laterally adjustable at said bracket, and wherein said bracket mounts to said support frame such that the displacement of said first and second cushions can be varied relative to said support frame.

13. Apparatus as set forth in claim 1 including first and second hand wheels, first and second wheels secured to said base, and a plurality of pulleys secured to said first and second hand wheels and first and second wheels, and including a plurality of belts trained between said pulleys at said first and second hand wheels and first and second wheels to selectively rotate said first and second wheels and propel said framework with movement of said first and second hand wheels.

14. Support apparatus for supporting and manipulating a user between sitting and standing positions comprising:

a) a framework including 1) a plurality of frame members coupled to one another to provide a base and a telescoping upright support frame secured to said base, 2) foot support means for supporting the feet of a user; and 3) seat means including a seat for pivotally securing said seat to said base;

b) chest support means secured to said support frame for supporting the chest of the user;

c) leg restraint means secured to said support frame for restraining the legs of the user; and d) lift means mounted to said base for pivoting said seat, and including a piston mounted and biased for reciprocating movement within a cylinder, wherein said piston is mounted to a pivot at said seat and said cylinder is mounted to pivot at a linkage arm, which linkage arm is secured to a pivot at said base and to a pivot at an upright cross tower which extends from said base, wherein a pump means controls the movement of said piston, wherein movement of said piston rotates said seat between a transverse orientation to said support frame at a sitting position and a parallel, displaced orientation to said support frame at a standing position, and wherein at said standing position said seat supports the user in engagement with said chest support means and said leg restraint means.

15. Support apparatus as set forth in claim 14 wherein said seat comprises a seat frame and a back frame, wherein said seat frame is mounted to a first pivot means at said cross tower, and including means for selectively fixing the displacement of a seat cushion secured to said seat frame and relative to said back frame, and further including means for selectively fixing the inclination of said back frame to said seat frame.

16. Support apparatus as set forth in claim 15 wherein said seat frame includes first telescoping means for varying the displacement of said seat cushion from said back frame, wherein a second telescoping means varies the inclination of said back frame relative to said seat frame, and wherein said second telescoping means is mounted to a second pivot means secured to said cross tower.

17. Support apparatus as set forth in claim 14 wherein said foot support means is secured to said cross tower, and wherein said foot support means includes foot support pads which are independently and vertically adjustable relative to said cross tower.

18. Support apparatus as set forth in claim 14 including first and second hand wheels, first and second wheels secured to said base, and a plurality of pulleys secured to said first and second hand wheels and first and second wheels, and including a plurality of belts trained between said pulleys at said first and second hand wheels and first and second wheels to selectively rotate said first and second wheels and propel said framework with movement of said first and second hand wheels.

19. Support apparatus for supporting and manipulating a user between seated and standing positions comprising:

a) a framework including 1) a plurality of frame members coupled to one another to provide a base and a telescoping upright support frame secured to said base, 2) foot support means for supporting the feet of a user and including an upright cross tower secured to said base, a pair of foot support pads secured to the cross tower and means for independently and vertically adjusting each foot support pad relative to said cross tower; and 3) seat means including a seat for pivotally securing said seat to said base;

b) chest support means secured to said support frame for supporting the chest of the user;

c) leg restraint means secured to said support frame for restraining the legs of the user; and d) lift means mounted to said base for pivoting said seat and including a piston mounted and biased for reciprocating movement within a cylinder, wherein a latch means is operative to selectively grip said piston and control the movement of said piston such that in a release position said piston is free to extend and retract relative to the weight of the user on said seat and in a latch position said piston and seat are prevented from moving, wherein movement of said piston rotates said seat between a transverse orientation to said support frame at a sitting position and a parallel, displaced orientation to said support frame at a standing position, and wherein at said standing position the seat supports the user to engage said chest support means and said leg restraint means.

20. Support apparatus for supporting and manipulating a user between seated and standing positions comprising:

a) a framework including 1) a plurality of frame members coupled to one another to provide a base and a telescoping upright support frame secured to said base, 2) foot support means secured to said base for supporting the feet of a user; and 3) seat means including a seat for pivotally securing said seat to said base;

b) chest support means secured to said support frame for supporting the chest of the user;

c) leg restraint means secured to said support frame for restraining the legs of the user; and d) lift means mounted to said base for pivoting said seat and including a piston mounted and biased for reciprocating movement within a cylinder, wherein said piston is mounted to a pivot at said seat and said cylinder is mounted to pivot at a linkage arm, which linkage arm is secured to a pivot at said base and to a pivot at an upright cross tower which extends from said base, wherein a hand operated pump means controls the flow of a fluid in said cylinder and the movement of said piston, wherein movement of said piston pivots said seat between a transverse orientation to said support frame at a sitting position and a parallel, displaced orientation to said support frame at a standing position, and wherein at said standing position said seat supports the user in engagement with said chest support means and said leg restraint means.

* * * * *